United States Patent [19]

Kent

[11] 4,415,001

[45] Nov. 15, 1983

[54] PRESSURE RISE RATE LIMITER VALVE

[75] Inventor: Preben Kent, Altadena, Calif.

[73] Assignee: Brunswick Corporation, Skokie, Ill.

[21] Appl. No.: 257,225

[22] Filed: Apr. 24, 1981

[51] Int. Cl.³ ............................................. F16K 31/12
[52] U.S. Cl. ............................... 137/497; 137/505.18; 137/505.25
[58] Field of Search .................. 137/497, 505.18, 504, 137/505.25, 505.41

[56] References Cited

U.S. PATENT DOCUMENTS

| 9,196 | 5/1880 | Noyes | 137/497 |
|---|---|---|---|
| 2,558,292 | 6/1951 | Faller | 137/505.41 X |
| 2,721,640 | 10/1955 | DeFeo | 137/497 X |
| 2,920,647 | 1/1960 | Mercier | 137/505.18 |
| 3,094,141 | 6/1963 | Mainknecht | 137/505.25 |
| 4,319,604 | 3/1982 | Bird | 137/504 X |

Primary Examiner—Harold W. Weakley
Attorney, Agent, or Firm—Wood, Dalton, Phillips, Mason & Rowe

[57] ABSTRACT

A pressure rise rate limiter valve (10) is designed to limit a pressure surge of a gas or fluid through a rapidly opening valve, thus avoiding hazardous heat buildup in the system. The valve has an inlet port (14) and an outlet port (16) with a spool (24) having a passageway (32) communicating between the two ports. Said passageway (32) also communicates with a cavity (123) in the valve housing (12) through a restricted orifice (36) located at the end opposite the outlet port (16). The gas introduced at the inlet (14) is directed through a series of feeder ports (38) in the spool (24) into the passageway (32) wherein the gas is dispersed both toward the outlet port (16) and toward the cavity (123) in the housing (12). The flow directed towards the cavity (123) causes a pressure rise at the wall surrounding the restricted orifice (36), which urges the spool (24) axially towards the cavity (123), compressing a retaining spring and moving the feeder ports (38) out of alignment with the inlet port (14), thereby cutting off the gas flow. Once the gas bleeds through the restricted orifice (36) into the cavity (123), the downstream pressure and the cavity pressure will begin to equalize, whereupon the compressed spring (46) gradually urges the spool (24) back towards the full flow position.

6 Claims, 5 Drawing Figures

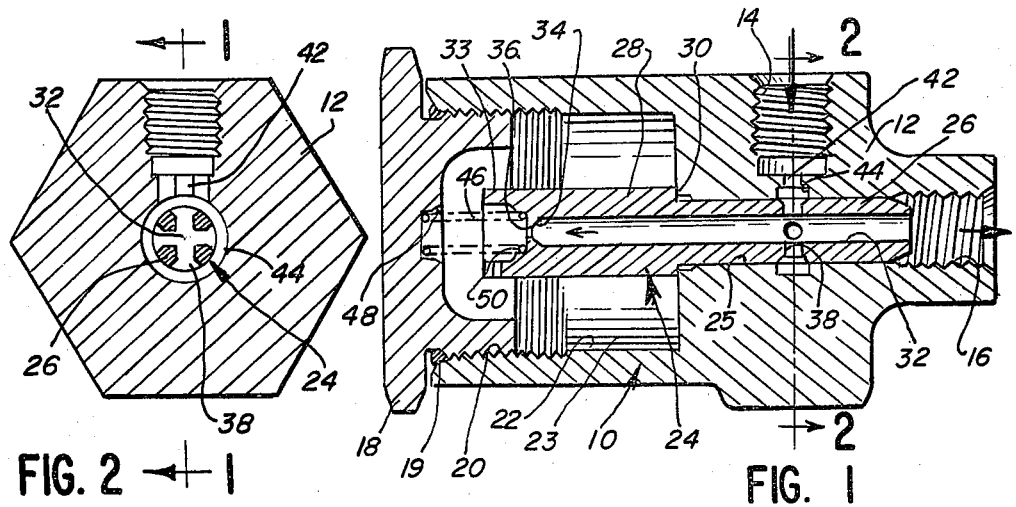
FIG. 2
FIG. 1
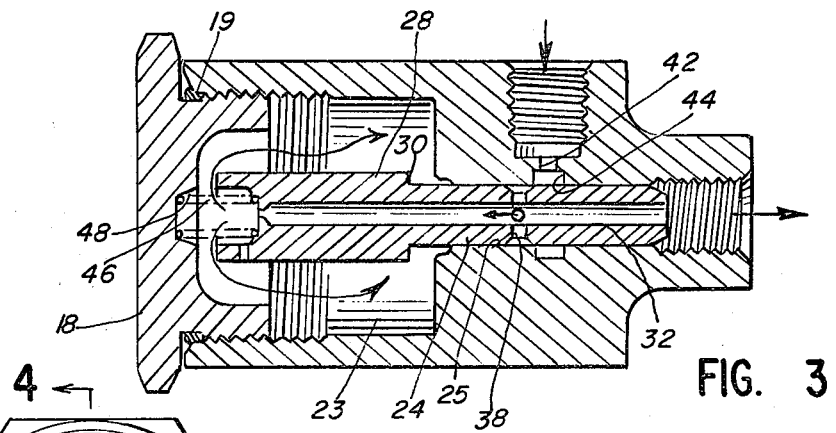
FIG. 3
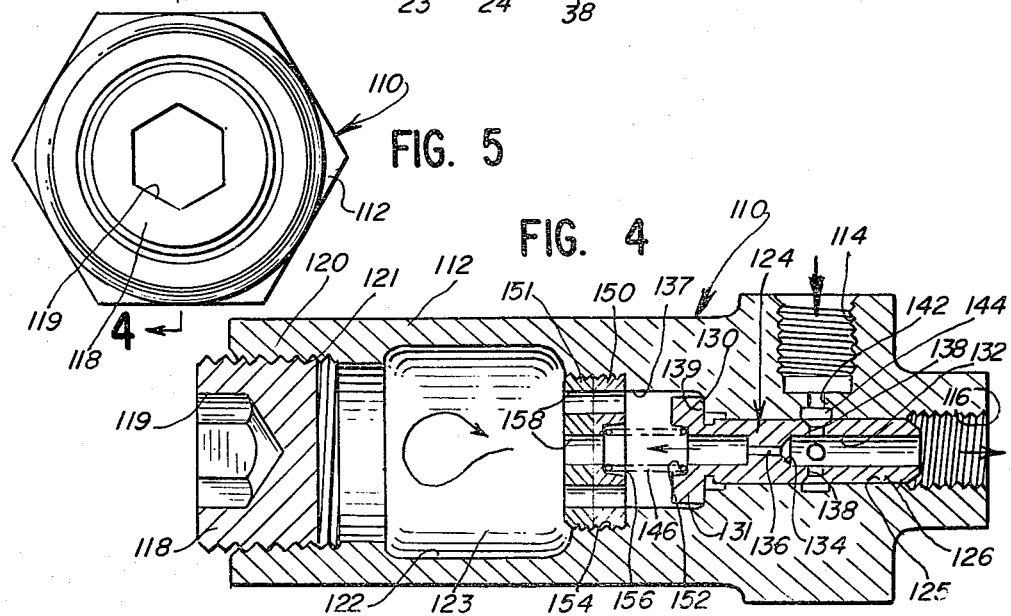
FIG. 5
FIG. 4

PRESSURE RISE RATE LIMITER VALVE

DESCRIPTION

TECHNICAL FIELD

The present invention is directed to valves and, more particularly, to valves for limiting rapid pressure rise and heat buildup resulting from a sudden opening of a gas supply valve, a sudden surge in a gas flow system, or a sudden closure of a shutoff valve downstream of the controlled process.

BACKGROUND ART

Where a quick opening valve is used on compressed gas containers, there is rapid pressure buildup downstream which results in a compression of the gas and an undesirable and oft times dangerous temperature increase. The compression of the gas may also be caused by a sudden closure of a shutoff valve downstream of the controlled process. In the event that oxygen is the gas being used, the resulting adiabatic compression could create an explosive condition should there be any grease or foreign material present in the oxygen chamber.

One attempted solution to the problem is shown in U.S. Pat. No. 2,864,400 to H. P. Wiegel, which shows a double cutoff assembly. In the closed position, the force of both valves in series is transmitted to the valve seat. The main valve is operated manually, discharging gas through an orifice. When the main valve is opened, the auxiliary valve responds to the downstream conditions resulting from the discharge of gas through the orifice. Once sufficient pressure is built up in the discharge nozzle, the auxiliary valve will be forced open, and the gas will discharge at full volume.

However, in U.S. Pat. No. 2,864,400, until the nozzle pressure is sufficient to open the auxiliary valve, flow is permitted solely through the orifice and consequently restricted by the reduced orifice area. Thus, there exists a range of unattainable pressures from the time the initial flow is initiated until the auxiliary valve is unseated.

An alternative valve arrangement is shown in U.S. Pat. No. 824,425 to C. H. Johnson which shows a cylindrical valve assembly at an intermediate position on a fluid line which is responsive to the pressure differential in the line caused by a downstream motor. The tapered valve chamber houses a spring-urged piston valve. When downstream pressure is increased, the piston is urged against the inlet flow affording a maximum passageway for the inlet fluid around the periphery of the piston valve. When downstream pressure is decreased, the incoming fluid will overcome the spring force, urging the spring in the direction of flow and restricting the aforementioned passageway. If the pressure differential is great enough, the peripheral flow around the piston may be entirely cut off. A bleeder port extends through the valve assembly so that fluid flow in the line is not completely obstructed.

The present invention is directed to overcoming one or more of the problems as set forth above.

DISCLOSURE OF INVENTION

In an exemplary embodiment of the invention, the device has an exterior housing defining an internal valve chamber, wherein a movable hollow spool is positioned, the lateral movement of which is restricted by spring means adjacent one end of the spool. Through this same end the spool communicates with a pressure chamber through a restricted orifice, the opposite end of said spool communicating with a discharge port.

Both extremities of the spool communicate with the valve inlet through a series of feeder ports located at the same lateral position on the spool. The flow is initiated from a source of high pressure gas into the valve at the inlet port which directs the gas into an annular chamber around the periphery of the spool. From the chamber the gas is directed radially inward through the feeder ports and diffuses in opposite directions in the spool. The gas flow directed towards the restricted orifice causes a pressure rise at the walls of the restricted orifice due to the reduced cross-sectional area thereof. The increased pressure urges the spool laterally in the direction of the pressure chamber, compressing the retaining spring and moving the feeder ports out of line with the annular chamber. As the downstream pressure and the chamber pressures equalize, the spring restoring force urges the spool laterally towards the discharge port. As this occurs, the inlet and feeder ports gradually realign until full fluid pressure is realized.

It is the overall object of this invention to improve the pressure rise rate apparatus used on high pressure gas containers, simplifying the construction and operation of such apparatus, without compromising efficient performance. Those dangers inherent in the expulsion of pressurized gas from containers are obviated by the employment of the invention.

A further object of this invention is to activate the pressure rise rate apparatus only in the event of a sudden pressure rise in the valve, otherwise bypassing the mechanism, thereby allowing unrestricted flow between the inlet and discharge nozzle as the restricted orifice is no longer in the flow path.

A still further object of the inventon is to provide the pressure rise rate apparatus as a shunt in the event an obstruction is encountered or in the event there is a pressure buildup downstream, for instance, as could be caused by a sudden closure of a downstream valve. If any of the above conditions should occur, there would be a pressure rise in the spool, which would, in turn, increase the pressure against the shoulder surrounding the restricted orifice, urging the spool in a direction to misalign the feeder ports and annular chamber.

BRIEF DESCRIPTION OF THE DRAWINGS

FIG. 1 is a cross-sectional view of the valve assembly taken along line 1—1 of FIG. 2 where a no flow or a steady flow state has been established;

FIG. 2 is a cross-sectional view of the valve assembly taken along the line 2—2 of FIG. 1;

FIG. 3 is a view similar to FIG. 1 only with the valve spool moved to misalign the feeder ports from the inlet port reflecting a pressure differential between the inlet and outlet of the valve assembly;

FIG. 4 is a cross-sectional view taken along line 4—4 of FIG. 5 showing a modified form of the invention; and FIG. 5 is an end view of the modified form of the invention shown in FIG. 4.

BEST MODE FOR CARRYING OUT THE INVENTION

Referring particularly to FIG. 1, a pressure rise rate limiter valve 10 is shown and includes a valve housing 12 having a threaded inlet port 14 and a threaded outlet port 16. A cap 18 is threaded into a threaded portion 20 of an opening 22 in the end of the valve opposite to the outlet port 16 and together with an O-ring 19 seals the opening 22 and defines a cavity 23 in the housing 12. A spool 24 is axially slidable in a bore 25 in the housing 12 and has one reduced end portion 26 of one diameter and another end portion 28 of a larger diameter thereby defining a shoulder 30 therebetween. A passageway 32 extends throughout the length of the reduced diameter end portion 26 and partially through the larger diameter portion 28. The end of the passageway 32 has a tapered shoulder 34 terminating in a restricted orifice 36. The orifice 36 communicates between the passageway 32 and a cup-shaped end portion 33 of the spool. Feeder ports 38, which in the illustrated embodiment are four in number, communicate between the passageway 32 and the outer surface of the reduced diameter portion 26. The axis of each feeder port 38 is transverse to the axes of the feeder ports 38 on either side thereof.

The valve housing 12 has the bore 25 extending from the outlet port 16 to the end wall of the opening 22 in the housing. A port 42 communicates between inlet port 14 and a continuous groove 44 formed in the wall of the bore 25. The reduced diameter portion 26 of the spool 24 slides axially in said bore 25 with the shoulder 30 abutting against the end wall of the opening 22 around the mouth of the bore 25. A compression spring 46 is seated at one end in a recess 48 in the cap 18 and is seated at the other end in a stepped recess 50 formed in the cup-shaped end 33 of the spool 24. The loading of the spring 46 urges the spool 24 to the right so that the feeder ports 38 communicate with the groove 44, port 42 and inlet port 14. The loading of spring 46 can be varied by appropriate means such as the use of shims between the base of the recess 48 and the end of the spring 46.

FIGS. 4 and 5 illustrate a modified form of pressure rise rate limiter valve 110 having a housing 112, an inlet port 114, and an outlet port 116. A cap 118 having a hexagonally-shaped tightening socket 119 and having tapered threads 120 is threaded into threads 121 in the opening 122 to define a cavity 123 in the housing. The tapered threads 120 assist in preventing leakage from the cavity 123. A spool 124 is axially slidable in a bore 125 in the housing and has a reduced diameter portion 126 with a shoulder 130 formed by a collar 131 near one end of the spool 124. A passageway 132 extends from the end of the spool 124 adjacent the outlet port 116 to a tapered shoulder 134 terminating in a restricted orifice 136. The orifice 136 communicates with a recess 152 in the collar 131 of the spool.

The valve housing 112 has the bore 125 which enlarges at one end into an intermediate opening 137 to define an end wall 139 against which the shoulder 130 of the spool 124 can abut. A pair of multi-apertured members 150,151 are threaded into a threaded portion 154 of the intermediate opening 137 with one member 150 having a recess 156 for receiving one end of a compression spring 146, the other end of the compression spring 146 seating in the recess 152 in the spool 124. The other member 151 acts as a lock nut to seat member 150 positively in the housing. The members 150,151 have a plurality of aligned apertures 158 to permit ready communication between cavity 123, opening 137 and the passageway 132 in the spool 124. The members 150,151 can be used to adjust the loading of spring 146 by locating member 150 where desired and using member 151 as a lock nut to lock member 150 in the selected position.

In this way, the rise rate can be fine tuned to a desired setting.

The valve housing 112 has a port 142 communicating between inlet port 114 and a continuous groove 144 formed in the wall of the bore 125. Feeder ports 138 extend between the passageway 132 and the outer surface of the spool 124. The feeder ports 138 are located along the spool 124 relative to the shoulder 130 such that when shoulder 130 is against wall 139 of opening 137, the ports 138 are in full communication with the groove 144 and inlet port 114.

INDUSTRIAL APPLICABILITY

The pressure rise rate limiter valve 10 is plumbed into a pressurized system, for instance, an oxygen system where a high pressure source of oxygen in a tank or an accumulator is connected to the inlet port 14 with the outlet port 16 connected to a work station, such as an oxygen fed life support system, or the like. Upon opening the valve on the tank or accumulator, a rush of gas enters the limiter valve 10, passes through port 42, groove 44 and ports 38 into the passageway 32 of the spool 24. The gas will branch out in the passageway 32 with part moving toward outlet port 116 and part moving toward shoulder 34 and orifice 36. If the force effect of the pressure surge of the gas exceeds the spring 46 loading on the spool 24, the gas bearing on the shoulder 34 will move the spool 24 to the left compressing spring 46 and misaligning ports 38 from the groove 44 shutting off the flow of gas from the tank into the spool 24. The gas in the passageway 32 in the spool 24 will bleed through the orifice 136 into the cavity 123, which gas in the cavity will slowly build up equalizing pressure until the force of the spring and gas pressure in the cavity 123 will move the spool 24 to the right to gradually realign the ports 38 with the groove 44 so that gas will again flow into the spool and on through the outlet port 16 to the work station. The movement of the spool to a shutoff position under the force of the gas prevents too rapid a discharge of the gas, which rapid discharge could cause heat rise in the system resulting in an explosion if the conditions are right.

The operation of the modification of FIGS. 4 and 5 is substantially the same as for FIGS. 1-3, the chief difference being in the structure and assembly of the valve 110. That is, the spool 124, the spring 146 and the members 150,151 are assembled through the open end with the cap 118 removed. The loading of the spring is determined by the setting of the member 150 in the threaded opening 154 prior to setting the member 151 into a locked position. The cap 118 is threaded into position to seal the cavity 123, but does not serve any spring tensioning function.

The valves 10,110 have the advantages that they function quickly to prevent quick acting valve openings from causing heat or other damaging reactions from becoming dangerous and at the same time permit full volume gas flow when the potentially dangerous situation has been neutralized.

The valves 10,110 also function to shut off gas flow upon a sudden pressure surge downstream of the valve as may be caused by a quick closure of a shutoff valve. That is, a pressure surge downstream will cause a pressure buildup on the shoulder 34,134 around the orifice 36,136 whereupon the valve spool 24,124 will compress the spring 46,146 to shut off the flow of gas from the tank. The surge will be dampened whereupon the spool will reset in the flow condition having prevented the surge from reaching the tank.

The volume of the cavity 123 must be matched to the size of the orifice 36 to control the rate of pressure equalization. For instance, in one operative system, the volume of the cavity 123 was 2.43 cubic inches with the diameter of the orifice 36 being 0.015 inches. The valve had a rise time minimum of 0.5 seconds at a pressure of 0–500 psi.

Other aspects, objects and advantages of this invention can be obtained from a study of the the drawings, the disclosure and the appended claims.

I claim:

1. A pressure rise rate limiter valve, comprising:
   a housing having an elongate bore axially aligned with an enlarged opening defining a cavity in communication with said bore,
   said housing having an axially extending outlet port communicating with said bore at the end of the bore opposite to said cavity, a radially extending inlet port in said housing between said cavity and said outlet port and communicating with said bore,
   a valve spool slidably mounted in said bore and having an axially extending passageway communicating with said axially extending outlet port, an axially facing internal shoulder in the passageway at the end of the passageway remote from said outlet port, said shoulder having a restricted orifice formed therein in communication between said passageway and said cavity,
   said spool having radially directed feeder ports located between said outlet port and said shoulder communicating with said axial passageway in said spool, said feeder ports being selectively alignable with said inlet port in said housing, and
   resilient means for urging said spool into position to align the feeder ports with said inlet port, said resilient means being located in said cavity and bearing against the end of said spool containing said restricted orifice, whereby a sudden increase in pressure of a fluid connected to the inlet port or the outlet port causes the fluid to contact the shoulder surrounding the orifice in the passageway to move the spool axially against the resilient means to decrease or to cut off the fluid flow between the inlet port and the feeder ports, said fluid in the passageway bleeds through the orifice into the cavity to increase the pressure in the cavity which pressure combines with the urging of said resilient means to gradually move the spool toward the original position as the fluid pressure in the cavity approaches an equilibrium with the fluid pressure in the passageway in the spool, wherein the feeder ports and inlet port will gradually realign until full fluid flow is directed through the passageway and through the outlet port.

2. The pressure rise rate limiter valve as claimed in claim 1 wherein a continuous annular groove is formed in the wall of the bore in the housing and surrounds the valve spool, said groove communicates between said inlet port, said feeder ports and said passageway in the valve spool when the valve is in the full fluid flow position.

3. The pressure rise rate limiter valve as claimed in claim 2 wherein the spool is of at least two different diameters to define an external shoulder which abuts an internal wall of said cavity when the feeder ports in the spool are aligned with said groove in the bore.

4. The pressure rise rate limiter valve as claimed in claim 1 wherein said resilient means include a spring confined between one end of the spool and a movable means for adjusting the tension of said spring.

5. The pressure rise rate limiter valve as claimed in claim 4 wherein said movable means is an end cap for defining the one boundary of said cavity.

6. The pressure rise rate limiter valve as claimed in claim 4 wherein said movable means is a member threaded onto a portion of said cavity, said member having plural openings to permit free flow of fluid therethrough.

* * * * *